United States Patent [19]
Dixon

[11] 3,859,302
[45] Jan. 7, 1975

[54] PREPARATION OF 2-IMINO-IMIDAZOLE DERIVATIVES
[75] Inventor: William D. Dixon, Kirkwood, Mo.
[73] Assignee: Monsanto Company, St. Louis, Mo.
[22] Filed: Feb. 5, 1973
[21] Appl. No.: 329,788

[52] U.S. Cl.................................. 260/309.6, 71/92
[51] Int. Cl........................................... C07d 49/34
[58] Field of Search.................................. 260/309.6

[56] References Cited
UNITED STATES PATENTS
| | | | |
|---|---|---|---|
| 3,136,776 | 6/1964 | Stoffel | 260/309.6 |
| 3,432,520 | 3/1969 | Pesterfield | 260/309.6 |
| 3,435,051 | 3/1969 | Pesterfield | 260/309.6 |
| 3,450,709 | 6/1969 | Lancini et al. | 260/309 |
| 3,459,763 | 8/1969 | Gruenfeld | 260/309 |

OTHER PUBLICATIONS
Pozharskii et al., Chem. Abst. Vol. 76, No. 244365, (1972) QD1.A51.

Primary Examiner—Natalie Trousof
Attorney, Agent, or Firm—William I. Andress; Donald W. Peterson; Neal E. Willis

[57] ABSTRACT

A class of 2-imino derivatives of substituted 4-imidazolines are prepared by the reaction of a carbodiimide and an alkynyl amine. Representative of this class of 4-imidazoline derivatives is 1-isopropyl-2-(3-methoxypropyl)imino)-3-(3,4-dichlorophenyl)-4-methyl-4-imidazoline oxalate.

10 Claims, No Drawings

PREPARATION OF 2-IMINO-IMIDAZOLE DERIVATIVES

BRIEF SUMMARY OF THE INVENTION

This invention relates to a process for the preparation of compounds of the formula

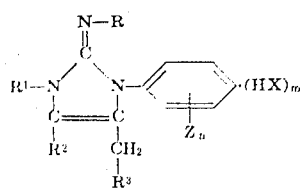

wherein R is lower alkyl or lower alkoxy lower alkyl; $R^1$ is lower alkyl; $R^2$ and $R^3$ are lower alkyl or hydrogen; Z is fluoro, chloro, bromo, lower alkyl, halo lower alkyl or lower alkoxy; $n$ is an integer zero through 2; $m$ is zero or 1; and X is an anionic moiety of an acid having a dissociation constant greater than about $5 \times 10^{-12}$; which comprises reacting a carbodiimide of the formula

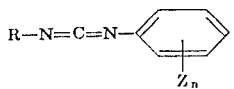

where R, Z and $n$ are as defined above, with an alkynyl amine of the formula

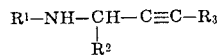

where $R^1$, $R^2$ and $R^3$ are as defined above and, where $m$ is 1, treating the resulting product with an acid of the formula HX where X is as defined above.

This invention relates to a novel method of preparing a class of imidazole derivatives which are useful for regulating the natural growth or development of plants.

The compounds prepared by the method of this invention are 2-imino derivatives of imidazoles and the strong acid salts thereof represented by the formula

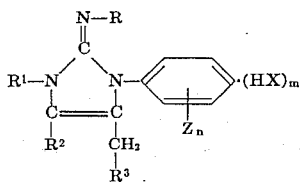

wherein:
R is lower alkyl or, and preferably, lower alkoxy lower alkyl;
$R^1$ is lower alkyl;
$R^2$ is lower alkyl or, and preferably, hydrogen;
$R^3$ is lower alkyl or, and preferably, hydrogen;
Z is fluoro, chloro, bromo, lower alkyl, halo lower alkyl, or lower alkoxy;
$n$ is an integer zero through 2;
$m$ is zero or 1; and
X is the anionic moiety of a strong acid.

As employed herein, the term "lower" designates those aliphatic radicals of not more than 4 carbon atoms in straight or branched chain. Representative lower alkyl substituents are methyl, ethyl, propyl, isopropyl, butyl, tert. butyl and the like. Where the substituent is alkoxy, it can be methoxy, ethoxy, propoxy, isopropoxy, butoxy, sec. butoxy and the like. When $n$ is 2 the substituents represented by Z can be like or unlike.

The acid salts of the compounds of formula (1) are derived from inorganic and organic acids having a dissociation constant greater than about $5 \times 10^{-2}$ and are, for example, the hydrochloride, hydrobromide, hydroiodide, hydrosulfate, perchlorate, dichloroacetate, trichloroacetate, oxalate, maleate, picrate and the like. Preferred salts are the hydrohalides, such as the hydrochloride, and the oxalate.

The novel method of this invention for preparing the imidazole derivatives comprises the reaction of a suitably substituted carbodiimide with a substituted alkynyl amine as illustrated generally by the following

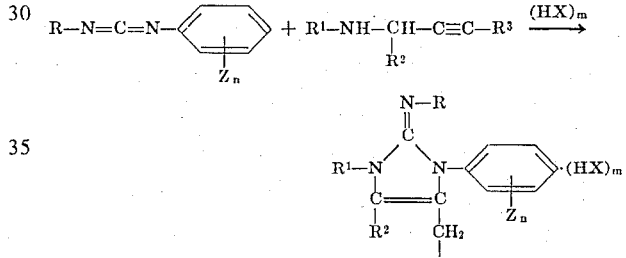

where R, $R^1$, $R^2$, $R^3$, Z, $n$, $m$ and X are as previously defined for formula (1).

The acid salts are preferred since they aid in the clean up and isolation of the compounds and exhibit good stability and plant growth-regulating activity. The acid salts of these imidazole derivatives are conveniently prepared by the addition of the strong acid to the product of the above reaction in a suitable solvent such as acetone, diethyl ether and the like.

The above reaction of the carbodiimide and the alkynyl amine is usually carried out in the presence of a suitable solvent such as benzene, toluene, xylene and the like. The temperature of the reaction can vary considerably, however, good results are obtained at elevated temperatures and the reaction is preferably run under reflux conditions. The reaction can be run at reduced or elevated pressures and, usually, adequate results are obtained at normal atmospheric pressure. The ratio of the reactants does not appear to be critical and for convenience a slight excess of the alkynyl amine can be used. Of course, the time of the reaction varies according to the conditions employed, however, adequate yields are obtained usually in a matter of hours, for example, from about 1 to 24 hours or longer. The reaction can be conveniently monitored by sampling and using infrared to observe the decrease in the carbodiimide at about 4.5 microns.

The above described imidazole derivatives of formula (1) and their use as plant regulants are the subject of a separate joint application of William D. Dixon and Gary L. Eilrich filed concurrently herewith and entitled "2-Imino Derivatives of Substituted Imidazoles," Ser. No. 329,787.

The preparation of the required carbodiimides and the alkynyl amines is well known in the art. The carbodiimides can be readily prepared by the reaction of yellow mercuric oxide with a suitably substituted thiourea as follows:

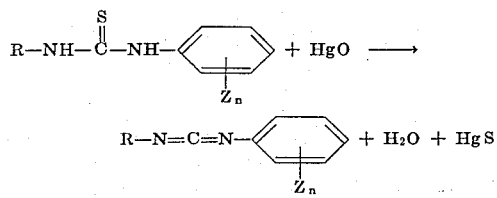

where R, Z and n are as previously defined for formula (1). It is preferred to conduct the above reaction in the presence of a suitable solvent for the azeotropic removal of the water. The preparation of the carbodiimides is shown in greater detail by H. G. Khorana, Chem. Reviews, Vol. 53 (1953) pp. 145–164 and the references cited therein.

The following examples are presented to further illustrate this invention. Parts and percentages are by weight unless otherwise indicated.

EXAMPLE I

1-Isopropyl-2-((3-methoxypropyl)imino)-3-(3,4-dichlorophenyl)-4-methyl-4-imidazoline oxalate.

In a suitable reaction vessel equipped with a thermometer, stirrer and Dean-Stark trap with condenser is placed 14.7 g (0.05 mole) of 1-(3,4-dichlorophenyl)-3-(3-methoxypropyl)-2-thiourea and 100 ml of benzene. The solution is heated to reflux and 16.2 g (0.075 mole) of yellow mercuric oxide is added in small portions. After this addition the reaction is held at reflux for 30 minutes at which time a total of 0.9 ml of water is collected in the Dean-Stark trap. The reaction medium is cooled and filtered. The filtrate is placed in a flask equipped with reflux condenser and 4.9 g (0.05 mole) of N-isopropyl-2-propynylamine is added and heated at reflux for 18 hours, then cooled and the solvent is removed in vacuo. The residue is dissolved in 10 ml of acetone and added to a solution of 6.3 g (0.05 mole) oxalic acid dihydrate in 40 ml of acetone in a suitable vessel and is diluted with 150 ml of ethyl acetate and cooled to yield 7.9 g of solid. The mother liquor is evaporated and the residue is treated with 10 ml of acetone which upon standing yields a solid which upon recrystallization from 15 ml of acetone and 30 ml of ethyl acetate yields an additional 4.3 g of solid for a total yield of 12.2 g (55%) of 1-isopropyl-2-((3-methoxypropyl)imino)-3-(3,4-dichlorophenyl)-4-methyl-4-imidazoline oxalate which upon recrystallization with a 2:1 mixture of ethyl acetate - acetone is a white solid having a mp 123–126. Nuclear magnetic resonance spectrum analysis in $D_2O$ confirms the following structure

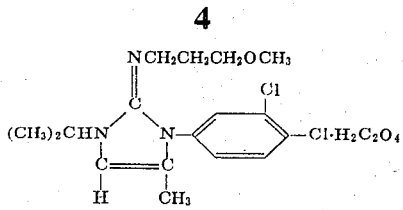

EXAMPLE II

1-Isopropyl-2-n-butylimino-3-(3,4-dichlorophenyl)-4-methyl-4-imidazoline oxalate.

In a suitable vessel equipped with a thermometer, stirrer and Dean-Stark trap with condenser is placed 16.2 g of yellow mercuric oxide in 100 ml of benzene. This suspension is heated to reflux with stirring and a solution of 13.8 g (0.05 mole) 1-butyl-3-(3,4-dichlorophenyl)-2-thiourea in 50 ml of benzene is added over a 10 minute period. The reaction medium is held at reflux for 10 minutes, cooled and filtered. The filtrate is placed in suitable vessel, equipped with a stirrer and reflux condenser and 6.0 g (0.06 mole) of N-isopropyl-2-propynylamine is added. The reaction medium is stirred 1 hour at room temperature and 3 hours at reflux conditions. The reaction medium is cooled and the solvent is removed in vacuo. The residue is dissolved in 10 ml of acetone and is added to a solution of 6.3 g oxalic acid dihydrate in 40 ml of acetone. Small amounts of impurities are removed by filtration and the filtrate is diluted with 100 ml of ethyl acetate and cooled overnight to provide a solid product which is recrystallized from acetone to provide 4.7 g product having a mp of 158°–161°C.

Anal. calcd. for $C_{12}H_{25}Cl_2N_3O_4$: C, 53.03; H, 5.86; N, 9.77. Found: C, 53.16; H, 5.75; N, 9.62.

EXAMPLE III

1-Isopropyl-2-((3-methoxypropyl)imino)-3-phenyl-4-methyl-4-imidazoline oxalate.

In a suitable vessel equipped with stirrer, powder addition funnel and a Dean-Stark trap with a condenser is placed 11.2 g (0.05 mole) of 3-(3-methoxypropyl)-1-phenyl-2-thiourea and 100 ml of benzene. The solution is heated to reflux and yellow mercuric oxide, 16.2 g, is added in small portions. After the addition is complete, the reaction is held at reflux for 10 minutes, cooled and filtered. The filtrate is placed in a vessel equipped with a stirrer and reflux condenser and 6.0 g of isopropyl 2-propynylamine is added. The reaction medium is stirred 1 hour at room temperature and then is heated at reflux for 4 hours. The reaction is cooled and allowed to stand overnight. Solvent was removed in vacuo and residue is taken up in 20 ml of acetone and is added to a solution of 6.3 g oxalic acid dihydrate in 40 ml of acetone. The solution is filtered and the filtrate is diluted with 150 ml of ethyl acetate. Upon cooling, the solvent is removed in vacuo and the residue is placed under 100 ml of ethyl acetate. Upon standing several hours, a gummy solid is formed which is removed by filtration and is recrystallized three times from acetone to give 4.9 g of product having a mp 120–121°C.

Anal. calcd. for $C_{19}H_{27}N_3O_5$: C, 60.46; H, 7.21; N, 11.13. Found: C, 60.54; H, 7.22; N, 11.02.

EXAMPLE IV

1-Propyl-2-((3-methoxypropyl)-imino)-3-(3,4-dichlorophenyl)-4-methyl-4-imidazoline oxalate.

In a vessel equipped with a thermometer, stirrer and Dean-Stark trap with condenser is placed 14.7 g (0.05 mole) of 1-(3,4-dichlorophenyl)-3-(3-methoxypropyl)-2-thiourea and 100 ml of benzene. The solution is heated to reflux and 16.2 g of yellow mercuric oxide is added in small portions. After the addition the reaction is held at reflux for 20 minutes, cooled and filtered. The filtrate is placed in a vessel equipped with stirrer and reflux condenser and 4.9 g (0.05 mole) of N-propyl-2-propynylamine is added. The reaction medium is stirred 1 hour at room temperature and 3 hours at reflux. The solvent is removed in vacuo, the residue is dissolved in 10 ml of acetone and then added to a solution of 6.3 g oxalic acid dihydrate in 40 ml of acetone. The solution is then diluted with 150 ml of ethyl acetate and cooled overnight to give 9.6 g solid, mp 115-120. The filtrate is evaporated and the residue is treated with 10 ml of acetone to give 1.5 g of solid, mp 111°-118°C. The two portions, 11.8 g, are combined and recrystallized twice from 50 ml of acetone to yield the product having a mp 116°-119°C.

Anal. calcd. for $C_{19}H_{25}Cl_2NCO_5$: C, 51.15; H, 5.65; N, 9.42. Found: C, 51.28; H, 5.56; N, 9.28.

EXAMPLE V

1-Butyl-2-((3-methoxypropyl)imino)-3-(3,4-dichlorophenyl)-4-methyl-4-imidazoline oxalate.

In a vessel equipped with a thermometer, stirrer and Dean-Stark trap with condenser is placed 14.7 g (0.05 mole) of 1-(3,4-dichlorophenyl)-3-(3-methoxypropyl)-2-thiourea and 100 ml of benzene. The solution is heated to reflux and 16.2 g of yellow mercuric oxide is added in small portions. After the addition the reaction is held at reflux for 20 minutes, cooled and filtered. The filtrate is placed in a vessel equipped with a stirrer and reflux condenser and 5.5 g of N-butyl-2-propynylamine is added. The reaction medium is stirred at room temperature for 1 hour and refluxed for 3 hours, cooled and solvent is removed in vacuo. The residue is dissolved in 10 ml of acetone and is added to a solution of 6.3 g oxalic acid dihydrate in 40 ml of acetone. The solution is filtered and the filtrate is diluted with 125 ml of ethyl acetate and cooled to give 10.1 g of solid, mp 115°-119°C. The product is recrystallized from 90 ml of acetone, mp 118°-122°C.

Anal. calcd. for $C_{20}H_{27}Cl_2N_3O_5$: C, 52.18; H, 5.91; N, 9.13. Found: C, 52.47; H, 6.14; N, 9.09.

EXAMPLE VI

1-Methyl-2-((3-methoxypropyl)imino)-3-(3,4-dichlorophenyl)-4-methyl-4-imidazoline oxalate.

In a vessel equipped with a thermometer, stirrer and Dean-Stark trap with condenser is placed 14.7 g (0.05 mole) of 1-(3,4-dichlorophenyl)-3-(3-methoxypropyl)-2-thiourea and 100 ml of benzene. The solution is heated to reflux and 16.2 g of yellow mercuric oxide is added in small portions. After the addition the reaction is heated at reflux for 20 minutes, cooled and filtered. The filtrate is placed in a vessel equipped with a reflux condenser and 3.5 g (0.05 mole) of N-methyl-2-propynylamine added. The reaction is heated at reflux for 5 hours, cooled and the solvent is removed in vacuo. The residue is dissolved in 10 ml of acetone and is added to a solution of 6.2 g oxalic acid dihydrate in 40 ml of acetone. The solution is diluted with 100 ml of ethyl acetate and cooled overnight to give 13 g solid which is recrystallized from isopropanol to yield the solid product having a mp of 154°-157°C.

Anal. calcd. for $C_{17}H_{21}Cl_2N_3O_5$: C, 48.81; H, 5.06; N, 10.05. Found: C, 49.25; H, 5.32; N, 9.88.

EXAMPLE VII

1-Methyl-2-((3Methoxypropyl)imino)-3-phenyl-4-methyl-4-imidazoline oxalate.

In a vessel equipped with a thermometer, stirrer and Dean-Stark trap with condenser is placed 11.2 g (0.05 mole) of 1-(3-methoxypropyl)-3-phenyl-2-thiourea and 100 ml of benzene. The solution is heated to reflux and 16.2 g of yellow mercuric oxide is added in small portions. After the addition the reaction medium is held at reflux for 20 minutes, cooled and filtered. The filtrate is placed in a vessel equipped with a reflux condenser and 3.5 g (0.05 mole) of N-methyl-2-propynylamine is added. The solution is heated at reflux for 12 hours, cooled and solvent is removed in vacuo. The residue is dissolved in 10 ml of acetone and is added to a solution of 6.3 g oxalic acid dihydrate in 40 ml of acetone. The solution is diluted with 50 ml of ethyl acetate and cooled. A gummy solid is obtained which is recrystallized from isopropanol to yield 6.1 g of the product having a mp of 131°-133°C.

Anal. calcd. for $C_{17}H_{23}N_3O_5$: C, 58.44; H, 6.64; N, 12.03. Found: C, 58.33; H, 6.49; N, 11.92.

EXAMPLE VIII

1-Isopropyl-2-((3-methoxypropyl)imino)-3-(3-trifluoromethylphenyl)-4-methyl-4-imidazoline oxalate.

In a vessel equipped with a stirrer, thermometer and Dean-Stark trap with condenser is placed 14.6 g (0.05 mole) of 1-(3-methoxypropyl)-3-(3-trifluoromethylphenyl)-2-thiourea and 100 ml of benzene. The solution is heated to reflux and yellow mercuric oxide, 16.2 g, is added in small portions. After the addition the reaction medium is held at reflux for 20 minutes and 0.8 ml of water is collected in the Dean-Stark trap. The reaction is cooled and filtered. The filtrate is placed in a vessel equipped with a reflux condenser and 4.9 g of isopropyl-2-propynylamine is added. The reaction medium is heated at reflux for 12 hours and then solvent is removed in vacuo. The residue is dissolved in 10 ml of acetone and is added to 6.3 g oxalic acid dihydrate in 40 ml acetone, 150 ml of ethyl acetate is added, and the solution is cooled overnight. No precipitate is obtained. The solvent is removed in vacuo and residue is taken up in 70 ml of ethyl acetate and cooled to −35°C. An oil precipitates which solidifies upon scratching. The product is recrystallized twice from ethyl acetate to yield 7.6 g of solid having a mp of 95°-99°C.

Anal. calcd. for $C_{20}H_{26}F_3N_3O_5$: C, 53,92; N, 5.88; N, 9.43. Found: C, 54.07; H, 5.98; N, 9.52.

EXAMPLE IX

1-Methyl-2-((3-methoxypropyl)imino)-3-(3-fluorophenyl)-4-methyl-4-imidazoline oxalate.

In a vessel equipped with a thermometer, stirrer and Dean-Stark trap with condenser is placed a solution of 1-(3-methoxypropyl)-3-(3-fluorophenyl)-2-thiourea 9.8 g (0.04 mole) in 100 ml benzene which is heated to reflux and 13.2 g of yellow mercuric oxide is added in small portions. After the addition the reaction medium is held at reflux for 20 minutes and 0.8 ml of water is collected in the Dean-Stark trap. The reaction is cooled and filtered and the filtrate is placed in a vessel equipped with a thermometer and 2.8 g (0.04 mole) of N-methyl-2-propynylamine is added. The reaction is heated at 75°C for 5 hours, cooled and the solvent is removed in vacuo. The residue is taken up in 10 ml of acetone and is added to a solution of 5.0 g oxalic acid dihydrate in 35 ml acetone. Ethyl acetate, 80 ml, is added and the solution cooled at −35°C overnight. An oil is obtained which, upon scratching, produces a solid which is recrystallized from acetone to yield 3.5 g of product having a mp of 143°–145°C.

Anal. calcd. for $C_{17}H_{22}FN_3O_5$: C, 55.57; H, 6.03; N, 11.43. Found: C, 55.61; H, 5.93; N, 11.17.

EXAMPLE X

1-Methyl-2-((2-ethoxyethyl)imino)-3-phenyl-4-methyl-4-imidazoline oxalate.

In a vessel equipped with a thermometer, stirrer and Dean-Stark trap with condenser is placed 11.2 g (0.05 mole) of 1-(2-ethoxyethyl)-3-phenyl-2-thiourea and 100 ml of benzene. The solution is heated to reflux and 16.2 g of yellow mercuric oxide is added in small portions. After the addition is complete, the reaction medium is held at reflux for 10 minutes, cooled and filtered. The filtrate is placed in a vessel equipped with a stirrer and reflux condenser and 3.5 g (0.05 mole) of N-methyl-2-propynylamine is added. The reaction medium is stirred 1 hour at room temperature and is heated at reflux for 4 hours. The solvent is removed in vacuo and the residue is taken up in 20 ml of acetone and is added to a solution of 6.3 g oxalic acid dihydrate in 40 ml of acetone. The solution is filtered and the filtrate is diluted with 150 ml of ethyl acetate. Upon cooling an oil is obtained. This oil is taken up in a mixture of acetone/ethyl acetate and precipitated by cooling. This procedure is repeated three times. The oil then is dissolved in acetone and upon prolonged cooling a solid is obtained which is recrystallized from acetone to yield 2.9 g of product having a mp of 113°–114.5°C.

Anal. calcd. for $C_{17}H_{23}N_3O_2$: C, 58.44; H, 6.63; N, 12.03. Found: C, 58.53; H, 6.64; N, 12.02.

EXAMPLE XI

1-Methyl-2-((3-isopropoxypropyl)imino)-3-phenyl-4-methyl-4-imidazoline oxalate.

In a vessel equipped with a stirrer, thermometer and Dean-Stark trap with condenser is placed 12.1 g (0.05 mole) of 1-(3-isopropoxypropyl)-3-phenyl-2-thiourea and 100 ml of benzene. The solution is heated to reflux and 16.2 g of yellow mercuric oxide is added in small portions. After the addition is complete, the reaction medium is held at reflux for 10 minutes, cooled and filtered. The filtrate is placed in a vessel equipped with a stirrer and reflux condenser and 3.5 g (0.05 mole) of N-methyl-2-propynylamine is added. The reaction medium is stirred for 1 hour and then is heated at reflux for 3 days. The solvent is removed in vacuo and the residue is taken up in a minimum of acetone and is added to a solution of 6.3 g oxalic acid dihydrate in 40 ml of acetone. Ethyl acetate, 150 ml, is added and upon cooling yields 7.1 g of product which upon recrystallization from isopropanol has a mp of 133°–135°C.

Anal. calcd. for $C_{19}H_{37}N_3O_5$: C, 60.45; H, 7.21; N, 11.13. Found: C, 60.31; H, 7.25; N, 10.89.

EXAMPLE XII

1-Isopropyl-2-((3-methoxypropyl)imino)-3-(3-trifluoromethyl-4-chlorophenyl)-4-methyl-4-imidazoline oxalate.

In a vessel equipped with stirrer, thermometer and Dean-Stark trap with condenser is placed 16.7 g (0.05 mole) of 1-(3-methoxypropyl)-3-(3-trifluoromethyl-4-chlorophenyl)-2-thiourea and 100 ml of benzene. The solution is heated to reflux and 16.2 g of yellow mercuric oxide is added in small portions. After the addition is complete, the reaction medium is refluxed for 10 minutes, cooled and filtered. The filtrate is placed in a vessel equipped with a reflux condenser and 4.9 g (0.05 mole) of N-isopropyl-2-propynylamine is added. The reaction mixture is heated at reflux for 24 hours, cooled and solvent is removed in vacuo. The residue is taken up in 20 ml of acetone and is added to a solution of 6.3 g oxalic acid in 40 ml of acetone. Ethyl acetate, 150 ml, is added and upon cooling a solid is obtained which is recrystallized from isopropanol to yield 7.5 g of product having a mp of 102°–105°C.

Anal. calcd. for $C_{18}H_{25}ClF_3N_3O_5$: C, 50.05; H, 5.25; N, 8.76. Found: C, 50.69; H, 4.87; N, 8.41.

The acid salts of the imidazole derivatives of this invention such as the hydrohalides, the hydrosulfate, the perchlorate, the di- and trichloroacetate, the maleate and the picrate are prepared by employing the procedures of Examples I through XII but replacing the oxalic acid with the appropriate acid.

The compounds prepared by the method of this invention are effective plant regulators for dicotyledonous plants. The compounds of Examples I through XII when applied to representative plants, such as soybeans, at various growth stages, elicit a growth regulation response. The treated plants develop a darker green foliar color and develop into smaller, bushier more effective plants. Further details of the beneficial properties of the compounds prepared by this invention are found in the joint application of W. D. Dixon and G. L. Eilrich "2-Imino Derivatives of Substituted Imidazoles" referred to hereinabove. Illustrations of the plant growth regulator activity of the compounds described herein are provided by reference to Example XIX and subsequent discussion found on page 26, line 24 through page 30, line 19 of the above-referenced copending application which reads as follows:

EXAMPLE XIX

In this evaluation soybean plants growing in individual pots which were 4 weeks old (3–4 trifoliate stage) and 6 weeks old (5–6 trifoliate stage) were used for each application of chemical. An overhead spray of an aqueous composition of the chemical is applied to 2 pots at each growth stage at an equivalent rate as indicated below. Two to four sets of plants which receive no chemical application are included and serve as controls. All of the pots are maintained under good growing conditions and are watered and are uniformly fertilized under uniform conditions. Two weeks after the application of the chemical the growth response of the treated plants are compared with that of the control plants. The total height of the plant is measured to the tip of the terminal bud. A decrease of 15% or more in the average total height of the treated plants, when compared to that of the control plants, demonstrates that the chemical is effective for regulating the natural growth or development of the plants. In addition to this retardation of vegetative growth other observations indicating a response in the plants treated with chemicals of this invention were noted.

Employing the procedure of Example XIX, representative compounds of this invention were effective in reducing the total height of the plant in excess of 15% at the equivalent rate of application indicated below to the four week old and six week old plants.

| Compound of Example | lbs/ acre | Other Observed Modifications |
|---|---|---|
| I | 0.5 | dark foliar color, axillary bud dev. |
| II | 2.5 | dark foliar color |
| III | 1.0 | dark foliar color, delayed pod set |
| IV | 2.5 | dark foliar color |
|  | 1.0 |  |
| V | 2.5 |  |
|  | 1.0 |  |
| VI | 2.5 |  |
| VII | 2.5 |  |
| VIII | 1.0 | sl. leaf burn, dark foliar color |
|  | 0.5 | dark foliar color, early pod set, inhibit pod dev. |
| XII | 1.0 | dark foliar color |
|  | 0.5 | dark foliar color |
| XIII | 1.0 | dark foliar color |
| XIV | 1.0 | sl. leaf burn, dark foliar color |
|  | 0.5 | dark foliar color, early pod set, inhibited pod dev. |

The compound of Example I was used as the active ingredient in field tests in two separate locations. In both tests Wayne soybeans were grown at excessive populations of approximately 200,000 plants per acre. The compound was applied as an aqueous composition to the plants at early bloom, about 10% bloom, and the treated plants were compared to control plants grown under the same conditions. At one location the chemical was applied at the rate of 1 pound and 2 pounds per acre. At both rates the treated plants when compared to the control plants demonstrated shorter, more compact plants having a darker green color and an improvement in the seed yield. The treatment at the 1 pound per acre rate provided the best yield improvement. At the other location the compound was applied at 0.75, 1.25 and 2.5 pounds per acre which resulted in shorter more compact plants having a darker green color. At the 0.75 pound per acre rate the yield was not affected. At the rate of 1.25 pounds per acre a yield improvement was obtained and at 2.5 pounds per acre the yield was very slightly less than the control plot. Accordingly, the most effective rate of application of the compound of Example I under these cultural practices is approximately 1.0 to 2.0 pounds per acre.

Another embodiment of this invention is a plant growth-regulating composition comprising an adjuvant and an effective plant growth-regulating amount of a compound of formula (1).

The plant growth-regulating compositions are particularly effective for practicing the method of regulating the natural growth or development of plants provided by this invention. In view of the activity of the imidazole derivatives at low rates of application, it is desirable to use compositions comprising an effective amount of the active ingredient and an adjuvant to facilitate a uniform distribution of the imidazole derivative on the plants. Adjuvant, as used herein, includes one or more materials in liquid or solid form. Thus, suitable adjuvants are diluents, extenders, carriers, surfactants, foaming agents, conditioning agents, solvents and, usually, combinations thereof. The compositions can be in numerous forms, such as, dusts, powders, wettable powders, solutions, foams, dispersions or emulsions. Generally, it is preferred to use one or more surfactants in the plant growth-regulating compositions which aid in wetting the treated plant surface and for providing stable dispersions of the active ingredient in various inert carriers or diluents in the composition or added to the composition prior to application to the plants. Suitable surfactants which can be employed in the compositions of this invention are well known surface active agents, such as, wetting agents, emulsifiers, dispersing agents and can be nonionic, anionic or cationic. Preferred surfactants are the nonionic or the anionic type which are widely used in compositions employed in agronomic treatments. Representative nonionic surfactants are polyoxyethylene esters of fatty acids, octylphenyl polyethylene glycol ethers, polyoxyethylene derivatives of long-chain alcohols and the like. Representative anionic surfactants are alkali and alkaline earth salts of alkylarylsulfonic acids such as sodium lauryl sulfonate, dialkyl sodium sulfosuccinate esters and the like.

Usually the plant growth-regulating compositions of this invention take the form of a concentrate which can be readily extended with an inert carrier prior to application to the plants. Said concentrates in liquid form consist of a solvent, surfactant and about 25 to 75% by weight of the imidazole derivative. These liquid concentrates can be diluted with water to provide a composition, suitable for application to plants, which contains from about 0.1 to about 15% by weight of the active ingredient. Concentrates in solid form are wettable powders consisting of finely divided solids such as attapulgite, surfactant and from about 5 to 50% or more by weight of the imidazole derivative which are diluted with water prior to applying to the plants.

In utilizing the methods and compositions of this invention, it is advantageous to treat dicotyledonous crops planted at excessive populations per unit area with an effective amount of the imidazole derivative to elicit a growth response in the plant which compensates for the overcrowding in the field and the usual reduction in yield.

The methods of this invention can be conveniently carried out in conjunction with agronomic practices such as treating the plants with insecticides, fungicides, nematocides, fertilizer and the like. The application of compositions containing an imidazole derivative as herein defined and other agricultural chemicals such as selective herbicides, insecticides, fungicides, fertilizers, nematocides and the like are particularly advantageous for obtaining the desired results with minimum treatment costs.

Although this invention has been described with respect to specific modifications, the details thereof are not to be construed as limitations, for it will be apparent that various equivalents, changes and modifications may be resorted to without departing from the spirit and scope thereof and it is understood that such equivalent embodiments are intended to be included herein.

The embodiments of the invention in which an exclusive property or privilege is claimed are defined as follows:

1. A process for preparing a compound within those of the formula

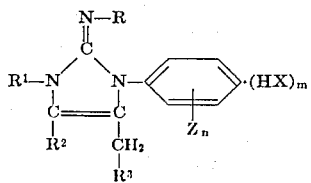

wherein: R is lower alkyl or lower alkoxy lower alkyl; $R^1$ is lower alkyl; $R^2$ is lower alkyl or hydrogen; $R^3$ is lower alkyl or hydrogen; Z is fluoro, chloro, bromo, lower alkyl, halo lower alkyl or lower alkoxy; $n$ is an integer zero through 2; $m$ is zero or 1; and X is an anionic moiety of an acid having a dissociation constant greater than about $5 \times 10^{-2}$ and which is compatible with the plant growth regulator activity of said compounds; which comprises reacting a carbodiimide of the formula

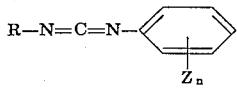

where R, Z and $n$ are as defined above, with an alkynyl amine of the formula

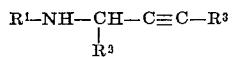

where $R^1$, $R^2$ and $R^3$ are as defined above and, where $m$ is 1, treating the resulting product with an acid of the formula

HX where X is as defined above.

2. The process of claim 1 wherein $m$ is 1.
3. The process of claim 2 wherein $R^2$ and $R^3$ are hydrogen.
4. The process of claim 2 wherein the reaction of the carbodiimide with the alkynyl amine is conducted in the presence of a solvent.
5. The process of claim 4 wherein the solvent is benzene.
6. The process of claim 4 wherein the reaction is conducted under reflux conditions.
7. The process of claim 4 wherein the alkynyl amine is N-isopropyl-2-propynylamine.
8. The process of claim 4 wherein the acid is oxalic acid.
9. The process of claim 7 wherein the carbodiimide is N-methoxypropyl-N'-3,4-dichlorophenylcarbodiimide.
10. The process of claim 9 wherein the acid is oxalic acid.

* * * * *